(12) United States Patent
West et al.

(10) Patent No.: US 6,444,244 B1
(45) Date of Patent: *Sep. 3, 2002

(54) METHOD FOR MAKING A SHELF-STABLE SOFT PRETZEL

(75) Inventors: Gregory Thomas West; Christopher John Cornwell, both of Little Elm, TX (US)

(73) Assignee: Recot, Inc., Pleasanton, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,613

(22) Filed: Jun. 18, 1999

(51) Int. Cl.[7] ............................................. A21D 15/00
(52) U.S. Cl. ..................... 426/289; 426/94; 426/143; 426/291; 426/293; 426/302; 426/496; 426/499
(58) Field of Search .................. 426/94, 496, 143, 426/499, 289, 302, 291, 293

(56) References Cited

U.S. PATENT DOCUMENTS

| | | |
|---|---|---|
| 3,876,815 A | 4/1975 | Kurzius |
| 3,976,791 A | 8/1976 | Seiberlich |
| 4,691,625 A | 9/1987 | Blain |
| 4,734,290 A * | 3/1988 | Meyer ................... 426/302 |
| 4,738,861 A | 4/1988 | Blain |
| 4,803,084 A | 2/1989 | Shine |
| 5,185,167 A | 2/1993 | Schwartz |
| 5,236,724 A * | 8/1993 | Burger ................... 426/94 |
| 5,238,693 A | 8/1993 | Walsh |
| 5,312,633 A | 5/1994 | Schwartz |
| 5,681,605 A * | 10/1997 | Takemori et al. ........... 426/499 |
| 5,965,180 A * | 10/1999 | Lonergan ................. 426/94 |

OTHER PUBLICATIONS

Kroskey, Carol Meres, "Take the plaunge with soft pretzels", Aug. 1996.*
George Higgins, "Snack with a twist: pretzel" The Baltimore Sun, Feb., 1999.*
"St. Louis Post Dispatch" Feb. 6, 1995.*

* cited by examiner

Primary Examiner—Lien Tran
(74) Attorney, Agent, or Firm—Colin P. Cahoon; Carstens, Yee & Cahoon

(57) ABSTRACT

A method for making a shelf-stable soft pretzel without using a caustic bath. The method substitutes several processing steps for the caustic bath, in combination with other microbal spoilage hurdle strategies, resulting in a uniformly browned, topically salted soft pretzel uniquely possessing a relatively low surface pH and long shelf life.

24 Claims, 2 Drawing Sheets

METHOD FOR MAKING A SHELF-STABLE SOFT PRETZEL

BACKGROUND OF THE INVENTION

1. Technical Field

The present invention relates to a shelf-stable soft pretzel and, in particular, to a soft pretzel product that maintains appearance, texture and taste over a long shelf life. The invention substitutes a number of preparation steps in place of the traditional caustic bath preparation step in order to lower the pretzel's pH in addition to other microbal spoilage hurdle strategies.

2. Description of Related Art

Soft pretzels have become one of the most popular bread snacks in the baking and food service industries. In the past, soft pretzels were a highly regional food, limited mostly to the Northeastern United States, but the popularity of soft pretzels has spread significantly both nationally and internationally during the past decade. This popularity comes from the fact that soft pretzels are typically made from a low fat, lean formula dough resulting in a healthy snack with good flavor and desirable eating characteristics.

Traditionally made, shelf-stable, soft pretzels exhibit a very poor shelf life and are quite susceptible to both microbal spoilage and staling. Use of chemical preservatives is ineffective in traditionally made soft pretzels because of a relatively high final surface pH, typically a pH of approximate 8. Chemical preservatives work best in a low pH environment and are usually not particularly effective above a pH of 6. The surface pH on a traditionally made soft pretzel is alkaline because of a necessary caustic bath or cook step. The critical role that the caustic bath step plays in making a pretzel is explained in more detail below.

Another problem encountered when trying to extend the shelf life of a soft pretzel is the fact that soft pretzels, as is typical of most soft bread products, exhibit a high water activity. ("Water activity" is the partial pressure of water in a food divided by the partial pressure of pure water under the same conditions.) If the fresh pretzel is packaged, this high water activity will soon translate into a high moisture content within the package. The presence of water vapor in the package promotes dissolving of the topical salt and eventually to a softening of the pretzel's crust. High water activity also promotes microbal spoilage.

As with other bread products, staling is also a problem encountered when attempting to store a soft pretzel for an extended period. While the effects of staling can be partially reversed by re-heating the pretzel, eventually the staling reaches a point that makes re-heating an ineffective remedy.

The problems encountered when attempting to extend the shelf life of a soft pretzel can be further understood by reviewing the processing for making a traditional soft pretzel. FIG. 1 is a flow chart showing the typical prior art method of making a soft pretzel. The first step is the dough preparation or mixing step 100, which involves combining various dough ingredients in the proper proportions as is well known in the food and baking industries. The pretzel dough is then physically manipulated to a desired pretzel shape in a product formation step 110. The product formation step 110 can be performed by any number of means well known in the art, such as twisting by extruders, hand twisting or shaping, or by the use of rolling devices. The pretzel dough is then dipped into a caustic or alakli bath 120, typically with a pH of over 12 and consisting of, for example, a two percent caustic solution at 165° farenheit. This caustic bath or cooking step 120 is often performed in what is referred to in the industry as a "pretzel cooker." caustic bath step 120 ultimately produces a number of effects which give rise to many of the distinctive features of a traditional soft pretzel. For example, the caustic bath step 120 promotes the uniform browning of the exterior of the pretzel. The caustic bath step 120 also imparts a unique flavor to the pretzel. Importantly, the caustic bath step 120 gelatinizes the starch of the pretzel. Starch gelatinization is the irreversible heat-induced change in a starch granule characterized by water uptake, swelling, and viscosity increases. The starch gelatinization produced by the caustic bath step 120 promotes the characteristic glossy and smooth finish of the exterior of the pretzel and provides a sticky surface for adhering granular salt during the salting step 130.

After the salting step 130 the pretzel then goes through a baking step 140 followed by a cooling step 150. Finally, unless the pretzel is consumed shortly after preparation, the pretzel must be packaged 160.

Without the effective presence of chemical preservatives, precluded by the high alkalinity imparted during the caustic bath, and in light of the high water activity found in a traditional soft pretzel, soft pretzels typically demonstrate a shelf life of less than a week. Such a short shelf life makes a soft pretzel product a poor candidate for retail distribution of the pretzel as a packaged product. By comparison, soft bagels, which have been successfully marketed as a relatively shelf-stable product, typically maintain color, texture, and taste for a period of two to three weeks. A soft pretzel product has yet to demonstrate a shelf life approaching that of bagels and other like products without sacrificing taste, color, and texture, thus making the prospect of mass marketing not economically viable or practical.

Attempts to extend the shelf life of soft pretzels have met with limited success resulting in mold spoilage and color degradation over time. Approaches to this issue have included lowering the surface pH slightly by de-emphasizing the caustic bath and lowering the water activity of the finished product. The latter is disclosed by U.S. Pat. No. 4,803,084 ("Shine"). Reducing the alkalinity of the pretzel only slightly, such as to the range of a pH of 6 to 7 does not increase the effectivity of chemical preservatives to the extent required to obtain a sufficiently long shelf life. Reducing the water activity alone, as in Shine, also only increases the shelf life for the pretzel slightly. Further, unless the water activity is lowered to the range of 0.73 or below the granular salt will turn into brine. It is also doubtful that the bread characteristics of a pretzel can be maintained at such a low water activity.

Accordingly, a need exists for a shelf-stable soft pretzel. This shelf-stable soft pretzel should demonstrate the characteristic look, texture, and taste of a traditional soft pretzel and yet be highly resistant to microbal spoilage and capable of maintaining a fresh taste and appearance, without color degradation, even when the product is exposed to regular atmosphere over an extended period. Further, the shelf-stable soft pretzel should not promote dissolving of the topical salt granules despite a high humidity content of the package or container.

SUMMARY OF THE INVENTION

The proposed invention comprises a method for preparing a shelf-stable soft pretzel by substituting various processing steps for the caustic bath step found in the traditional soft pretzel preparation and other microbal spoilage hurdle strategies. A steam or hot water step is combined with the application of a browning agent prior to baking the pretzel. A methyl-cellulose top coat is then applied followed by the topical application of enrobed salt. The product then undergoes a low temperature drying step prior to packaging. By eliminating the need for a caustic bath, food preservatives can be added to the dough preparation. The final surface pH has been demonstrated at less than 5.5, thus providing a suitable environment for the effectiveness of chemical preservatives. An anti-staling enzyme is also added to the dough prior to baking. Further, the enrobed salt is resistant to dissolving despite the presence of excess water vapor in any product packaging.

The end result is a shelf-stable soft pretzel which maintains the appearance, taste, and texture of a traditional soft pretzel, with resistance to microbal spoilage and color degradation, over a shelf life in excess of six weeks.

The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

A primary strategy behind the present invention is to eliminate the traditional caustic bath, thereby lowering the surface pH of the product to a range that permits the effective use of food/chemical preservatives. The elimination of the caustic bath, however, requires several separate steps and approaches so that the shelf-stable soft pretzel will have the same appearance, texture, and taste as the traditional soft pretzel.

Figure 1:
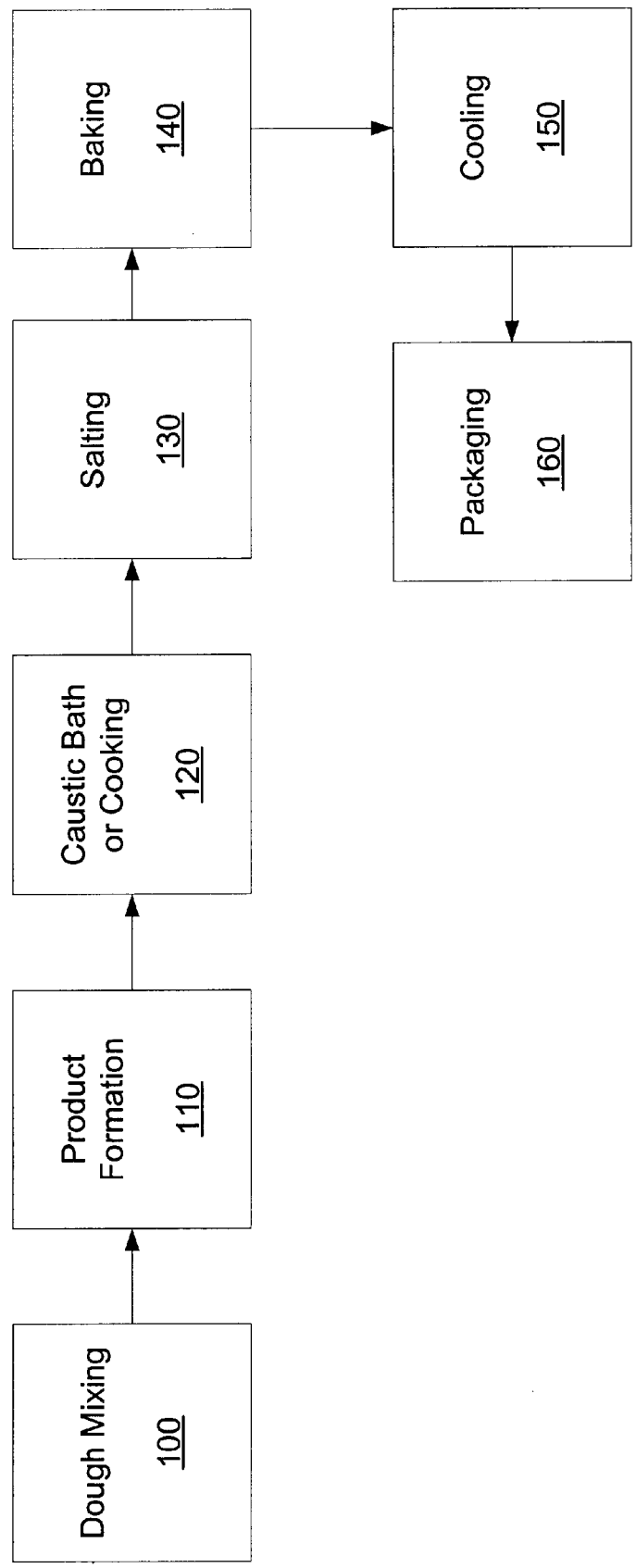
FIG. 1 is a flow chart of the traditional method for making a soft pretzel.
Figure 2:
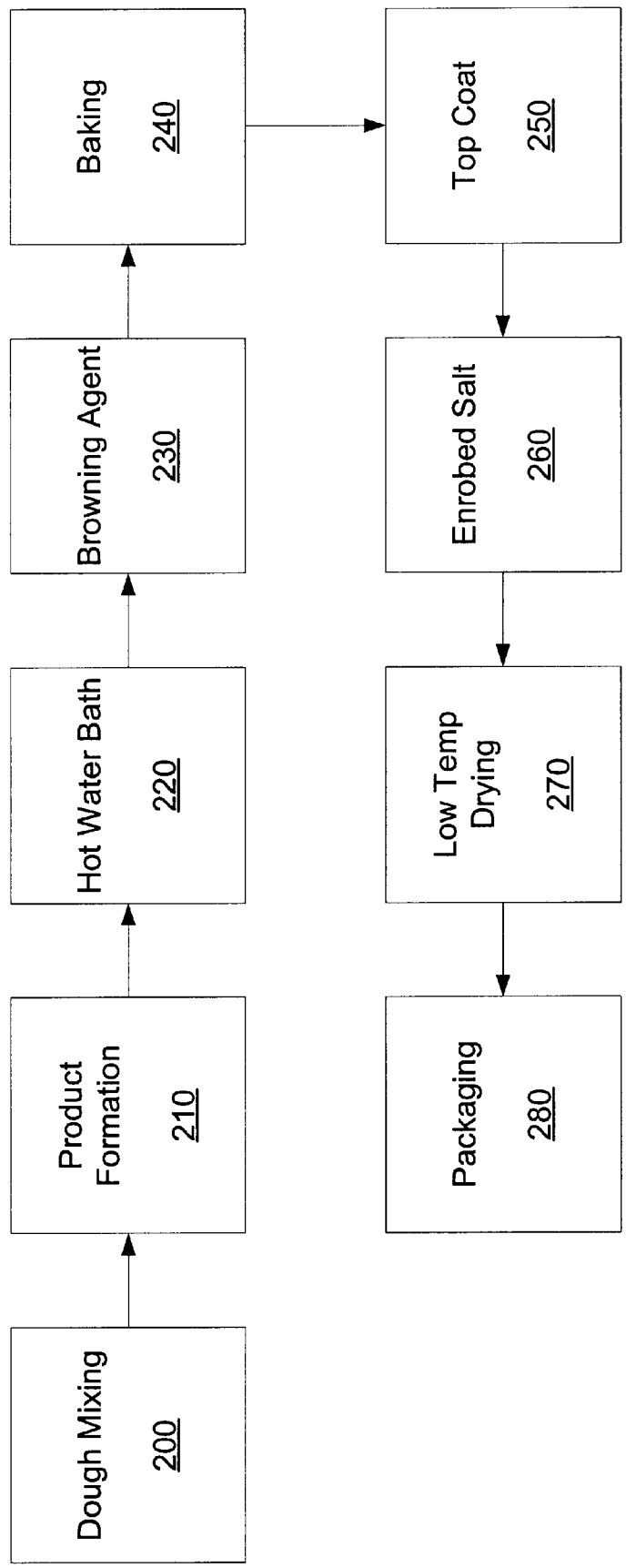
FIG. 2 is a flow chart of the method of one embodiment of the present invention.

FIG. 2 is a flow chart showing one embodiment of the method of the invention. As with the traditional method shown by FIG. 1, the present invention begins with a dough preparation or mixing step 200. This dough mixing step includes many of the same ingredients used in the dough mixing step 100 of the traditional method, which is well known in the art. In addition, however, food preservatives, anti-staling compounds, and flavoring additives are included in the dough ingredients, as will be described in more detail below. The dough is then processed during a product formation step 210, just as previously described when discussing the traditional method product formation step 110.

The next step in the present invention involves a hot water bath step 220. It is understood that when Applicant refers to a "hot water bath" in this application this term is meant generally to include either immersion of the dough product into a hot liquid comprising water or exposing the dough product to a steam bath. This hot water bath step 220 promotes starch gelatinization, which is one of the effects of the traditional caustic bath.

FIG. 2 shows the next step as a separate browning agent application 230. In the preferred embodiment the browning agent is actually applied during the hot water bath step 220, as the browning agent is water soluble. The addition of the browning agent can, however, be applied separately in a later step 230 as shown in FIG. 2. Coating of the pretzel dough with a browning agent in the browning agent step 230 provides a uniform brown appearance, which is another effect promoted by the traditional caustic bath. Maillose, which is a pyrolized dextrose manufactured by Red Arrow Products Co., Inc. of Manitowoc, Wis. has been found to be a suitable browning agent for the browning agent step 230.

The present invention next involves a baking step 240 similar to the baking step 140 of the traditional method, which is well-known in the art. The present invention then utilizes a top coat application step 250 in order to simulate the fresh, high gloss promoted by the traditional caustic bath step while also eliminating the development of stickiness on the pretzel surface after packaging. The top coat also acts as a glue for the adhesion of topical salt. Methocel A-15, a methyl-cellulose manufactured by Dow Chemical, has been found to be a suitable top coat used in the top coat application step 250. Flavor can also be incorporated into the top coat solution to provide enhanced pretzel flavor characteristics.

After the top coat is applied, the invention next involves an enrobed salt application step 260. Enrobed salt is a fat encapsulated salt that is resistant to being dissolved by water vapor. Suitable enrobed salt is presently available from Balchem Corporation of Slate Hill, N.Y. This enrobed salt is topically applied after the baking step 240, in contrast to the traditional method of adding the salt prior to the baking step 140, because excess heat would melt the fat which encapsulates the salt, thereby exposing the salt to the high moisture content of the pretzel. Instead, the pretzel is exposed to a low temperature (below 60° C.) drying step 270 in order to finalize the product in preparation for the packaging step 280.

Returning to the dough mixing stage 200, flavoring can be included in the initial dough preparation in order to better simulate the flavor of a traditional soft pretzel. Typical food preservatives that might be used at the mixing stage 200 include calcium propanate, ascorbic acid benzoic acid, citric acid, acidic acid, sorbic acid, lactic acid, or numerous other food preservatives well known in the art. The preservatives might also be used in combination with each other. A suitable anti-staling enzyme that can be including during dough preparation 200 is "Fresh-N enzyme" manufactured by Enzyme Development Corporation of New York, N.Y.

As an additional hurdle strategy, the moisture content of the pretzel can be slightly lowered to 25 to 35% and, consequently, the water activity of the pretzel is reduced to approximately 0.85. This is accomplished by adjusting the initial dough formula using standard techniques well known in the bread making industry and via baking. The moisture content need not be lowered to the extent it effects the bread qualities of the pretzel, as suggested by the Shine patent, U.S. Pat. No. 4,803,084, because dissolving the salt is not an issue when enrobed salt is used.

The surface pH of Applicants' pretzel will be naturally lower than pretzels traditionally made by virtue of eliminating the caustic bath step. The lower the pH, the more effective food preservatives will be at controlling microbial spoilage. The final pH of the pretzel can be controlled to some extent by dough preparation techniques well known in the art, however, the pH range is somewhat flavor limited. A target surface pH of below 5.5 will ensure the effectivity of chemical preservatives. A final surface pH of around 5.1 is believed to be acceptable from both flavor and chemical preservative effectivity stand points.

A shelf-stable soft pretzel made using Applicants' method has been found not to require modified atmosphere or oxygen scavaging packaging methods, although such could be used as an additional hurdle strategy to retard microbal degradation and to maintain freshness. It is important, however, that modified atmosphere packaging not be necessary in order to allow consumers to expose the product to the regular atmosphere without inducing spoilage. In packages with pin-hole leaks do not lead to product spoilage on the shelf for pretzels made as disclosed herein. The pretzel of the present invention can be displayed in a clear bag, since color degradation does not occur. Soft pretzels made using the methods described herein can maintain appearance, texture, and taste in normal atmosphere packaging for up to twelve weeks.

While the invention has been particularly shown and described with reference to a preferred embodiment, it will be understood by those skilled in the art that various changes in form and detail may be made therein without departing from the spirit and scope of the invention.

What is claimed is:

1. A method for making a shelf-stable bread product comprising the steps of:
   (a) preparing pretzel dough;
   (b) exposing the pretzel dough to a hot water bath;
   (c) applying a water soluble browning agent on the surface of the pretzel dough;
   (d) baking the pretzel dough to make a bread product;
   (e) applying a top coat to the bread product, wherein said top coat simulates the fresh, glossy finish promoted by a traditional pretzel caustic bath dip while also eliminating the development of stickiness on the pretzel surface after packaging;
   (f) adhering salt to the surface of the bread product; and,
   (g) drying the bread product at a temperature below 60° C.; wherein the bread product has a final surface pH below 5.5.

2. The method of claim 1 wherein step (a) further comprises preparing the dough with at least one food preservative.

3. The method of claim 1 wherein step (a) further comprises preparing the dough with at least one anti-staling compound.

4. The method of claim 1 wherein the salt of step (f) comprises enrobed salt.

5. The method of claim 1 wherein the dough preparation of step (a) comprises ingredients that affect a final water activity of the bread product of approximately 0.85.

6. The method of claim 1 wherein said final surface pH ranging from and including 4.7 to and including 5.3.

7. The method of claim 1 wherein steps (b) and (c) are combined in a single hot water bath comprising hot water and a browning agent.

8. The method of claim 1 wherein step (b) comprises a steam bath.

9. A method for making a soft pretzel comprising the steps of:
   (a) preparing the pretzel dough;
   (b) exposing the pretzel dough to a hot water bath;
   (c) covering the surface of the pretzel dough with a water soluble browning agent;
   (d) baking the pretzel dough;
   (e) apply a top coat to the pretzel, wherein said top coat simulates the fresh, glossy finish promoted by a traditional pretzel caustic bath dip while also eliminating the development of stickiness on the pretzel surface after packaging; wherein the pretzel has a final surface pH below 5.5.

10. The method of claim 9 further comprising the steps of:
    (f) adhering salt to the surface of the pretzel.

11. The method of claim 10 further comprising the steps of:
    (g) drying the pretzel at temperature below 60° C.

12. The method of claim 10 wherein the salt of step (f) comprises enrobed salt.

13. The method of claim 9 wherein step (a) further comprises preparing the dough with at least one food preservative.

14. The method of claim 9 wherein step (a) further comprises preparing the dough with at least one anti-staling compound.

15. The method of claim 9 wherein steps (d) and (c) are combined in a single hot water bath comprising hot water and a browning agent.

16. The method of claim 9 wherein the dough preparation of step (a) comprises ingredients that affect a final water activity of the pretzel of approximately 0.85.

17. The method of claim 9 wherein said final surface pH ranging from and including 4.7 to and including 5.3.

18. The method of claim 9 wherein step (b) comprises a steam bath.

19. The method of claim 1 wherein the browning agent of step (c) comprises a pyrolized dextrose.

20. The method of claim 1 wherein the browning agent of step (c) comprises Maillose.

21. The method of claim 1 wherein the top coat of step (e) comprises a methyl-cellulose.

22. The method of claim 9 wherein the browning agent of step (c) comprises a pyrolized dextrose.

23. The method of claim 9 wherein the browning agent of step (c) comprises Maillose.

24. The method of claim 9 wherein the top coat of step (e) comprises a methylcellulose.

* * * * *